(12) United States Patent
Kenner et al.

(10) Patent No.: US 9,046,354 B2
(45) Date of Patent: Jun. 2, 2015

(54) APPARATUS, SYSTEM AND METHOD FOR MEASURING STRAIGHTNESS OF COMPONENTS OF ROTATING ASSEMBLIES

(71) Applicant: Summit ESP, LLC, Tulsa, OK (US)

(72) Inventors: John Vanderstaay Kenner, Houston, TX (US); Thomas John Gottschalk, Houston, TX (US)

(73) Assignee: Summit ESP, LLC, Tulsa, OK (US)

( * ) Notice: Subject to any disclaimer, the term of this patent is extended or adjusted under 35 U.S.C. 154(b) by 89 days.

(21) Appl. No.: 13/796,470

(22) Filed: Mar. 12, 2013

(65) Prior Publication Data

US 2014/0240716 A1    Aug. 28, 2014

Related U.S. Application Data

(60) Provisional application No. 61/770,129, filed on Feb. 27, 2013.

(51) Int. Cl.
| | | |
|---|---|---|
| *B21D 7/12* | (2006.01) | |
| *B21D 53/84* | (2006.01) | |
| *G01B 9/08* | (2006.01) | |
| *G01B 11/24* | (2006.01) | |

(Continued)

(52) U.S. Cl.
CPC . *G01B 11/24* (2013.01); *B21D 3/16* (2013.01); *G01B 11/306* (2013.01)

(58) Field of Classification Search
USPC ............. 356/237.1–241.6, 242.1–243.8, 356/426–431, 600–640
See application file for complete search history.

(56) References Cited

U.S. PATENT DOCUMENTS 2,812,685 A * 11/1957 Vossberg ................ 356/639
3,308,302 A *  3/1967 Fuhrmann et al. ....... 250/559.14
3,604,940 A *  9/1971 Matthews ................ 356/638

(Continued)

FOREIGN PATENT DOCUMENTS

EP    0040034 A1    11/1981

OTHER PUBLICATIONS

Nowacki, J., et al., "Microstructure and characteristics of high dimension brazed joints of cermets and steel," Journal of Achievements in Materials and Manufacturing Engineering, Dec. 2009, 10 pages.

*Primary Examiner* — Kara E Geisel
*Assistant Examiner* — Jarreas C Underwood
(74) *Attorney, Agent, or Firm* — Frederic Dorwart, Lawyers; Penina Michlin Chiu

(57) ABSTRACT

An apparatus, system and method for measuring straightness of components of rotating assemblies are described. A digital mapping system for measuring the straightness of a shaft of an electric submersible pump comprises a light emitting micrometer. A method for measuring the straightness of components of rotating assemblies comprises providing a controller with acceptable deviation parameters for a component to be measured, surface mapping the component using a light emitting micrometer, electronically identifying bent locations on the component that exceed the acceptable deviation parameters, and measuring circumferentially at the bent locations with the light emitting micrometer to determine the magnitude of the bend. An apparatus for measuring a component of a rotating assembly comprises a light emitting micrometer configured to map the surface of a component and a range finder coupled to the micrometer for determining the location of the micrometer during measurement.

22 Claims, 8 Drawing Sheets

(51) Int. Cl.
*G01B 11/30* (2006.01)
*B21D 3/16* (2006.01)

(56) References Cited

U.S. PATENT DOCUMENTS

| | | | |
|---|---|---|---|
| 3,749,500 A * | 7/1973 | Carlson et al. | 356/638 |
| 3,842,192 A | 10/1974 | Hilker et al. | |
| 3,922,094 A * | 11/1975 | Colding et al. | 356/638 |
| 4,063,441 A * | 12/1977 | Eaton | 72/151 |
| 4,080,814 A * | 3/1978 | Eaton | 72/31.04 |
| 4,111,677 A * | 9/1978 | Andrews | 65/271 |
| 4,417,147 A * | 11/1983 | Faville | 250/559.14 |
| 4,464,919 A * | 8/1984 | Labbe | 72/162 |
| 4,508,556 A * | 4/1985 | Bennett et al. | 65/25.4 |
| 4,515,993 A | 5/1985 | MacKenzie | |
| 4,576,482 A * | 3/1986 | Pryor | 356/612 |
| 4,663,955 A * | 5/1987 | Redman | 72/129 |
| 5,007,291 A * | 4/1991 | Walters et al. | 73/640 |
| 5,309,746 A * | 5/1994 | Abbey, III | 72/8.3 |
| 5,326,935 A | 7/1994 | Yamaguchi et al. | |
| 5,362,925 A | 11/1994 | Yamaguchi et al. | |
| 5,589,928 A * | 12/1996 | Babbitt et al. | 356/4.1 |
| 5,699,161 A * | 12/1997 | Woodworth | 356/628 |
| 5,742,385 A * | 4/1998 | Champa | 356/141.4 |
| 5,836,188 A * | 11/1998 | Mahan et al. | 72/21.4 |
| 5,845,709 A | 12/1998 | Mack et al. | |
| 5,861,578 A | 1/1999 | Hake et al. | |
| 5,917,155 A | 6/1999 | Hake et al. | |
| 6,056,995 A | 5/2000 | Hake et al. | |
| 6,057,777 A * | 5/2000 | Dunne et al. | 340/686.1 |
| 6,288,342 B1 | 9/2001 | Ueoka et al. | |
| 6,319,604 B1 | 11/2001 | Xu | |
| 6,415,208 B1 * | 7/2002 | Pojda | 701/19 |
| 6,547,514 B2 | 4/2003 | Lee | |
| 6,676,366 B2 | 1/2004 | Kao | |
| 7,150,175 B2 * | 12/2006 | Traub | 72/159 |
| 7,456,978 B2 * | 11/2008 | Akamatsu | 356/638 |
| 7,748,597 B2 * | 7/2010 | Nicolai et al. | 228/151 |
| 8,070,426 B2 | 12/2011 | Brunner et al. | |
| 8,534,105 B2 * | 9/2013 | Shibata | 72/31.1 |
| 2008/0209947 A1 * | 9/2008 | Nemugaki et al. | 65/273 |
| 2010/0101828 A1 | 4/2010 | Duarte Pena et al. | |
| 2010/0181094 A1 | 7/2010 | Duarte Pena | |
| 2011/0192632 A1 | 8/2011 | Abe et al. | |

* cited by examiner

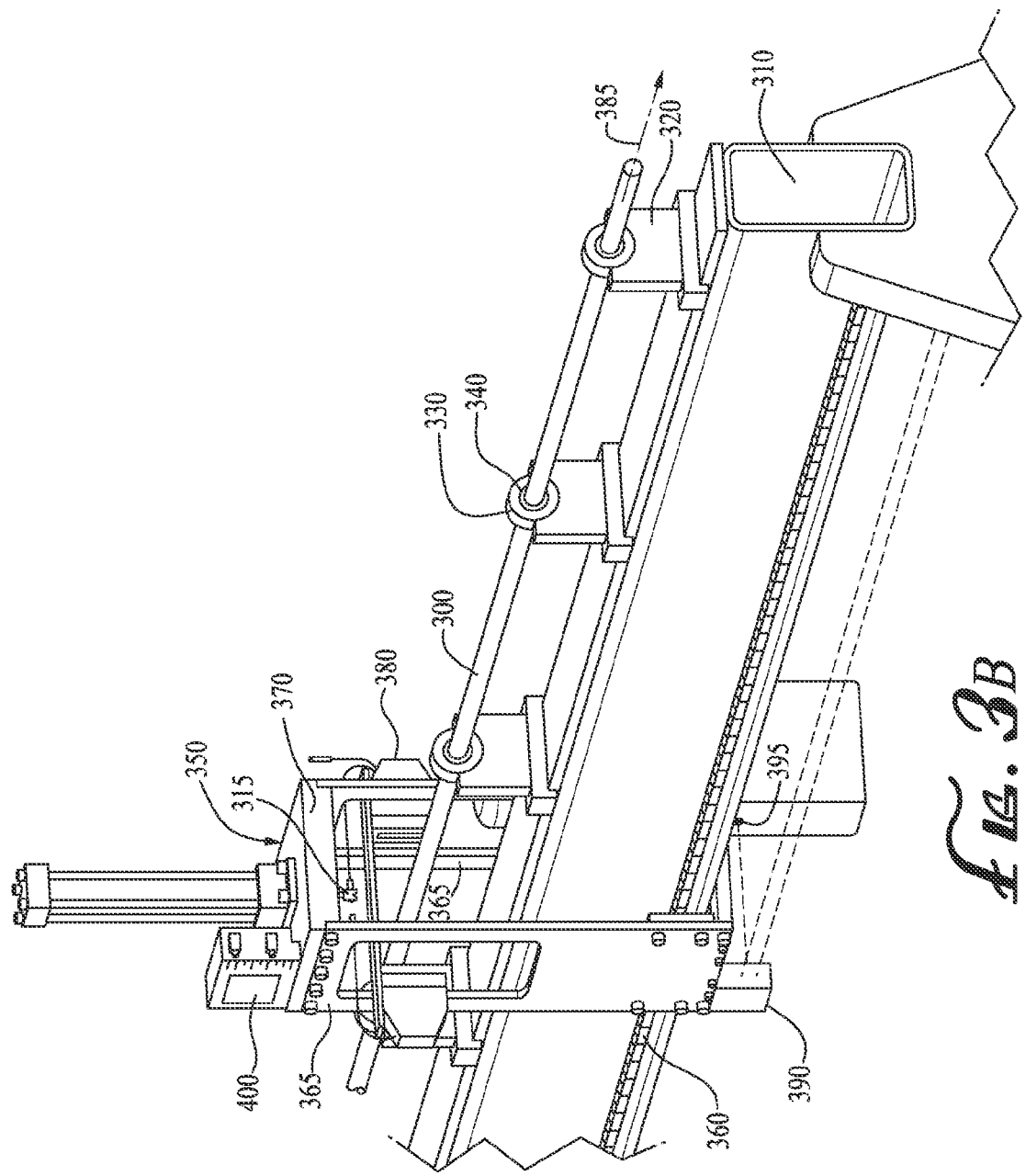

APPARATUS, SYSTEM AND METHOD FOR MEASURING STRAIGHTNESS OF COMPONENTS OF ROTATING ASSEMBLIES

CROSS REFERENCE TO RELATED APPLICATIONS

This application claims the benefit of U.S. Provisional Application No. 61/770,129 to Kenner et al., filed Feb. 27, 2013 and entitled "APPARATUS, SYSTEM AND METHOD FOR MEASURING STRAIGHTNESS OF COMPONENTS OF ROTATING ASSEMBLIES," which is hereby incorporated by reference in its entirety.

BACKGROUND OF THE INVENTION

1. Field of the Invention

Embodiments of the invention described herein pertain to the field of rotating assemblies. More particularly, but not by way of limitation, one or more embodiments of the invention enable an apparatus, system and method for measuring straightness of components of rotating assemblies.

2. Description of the Related Art

Shafting, tubing and other elements of rotating assemblies, for example in pump, drive shaft or axle applications, are required to be straight in order to operate correctly and efficiently. Specific straightness requirements depend on the particular application. High-speed multistage pump shafting, for example, has some of the most stringent straightness requirements; such shafts are required to be almost perfectly straight, within only a 0.002-0.003 inch acceptable deviation. For example, in the case of an electric submersible pump, a 20 foot long shaft may need to be straight throughout the length of the shaft within a 0.002 inch deviation. If the shaft is not straight within the allowed parameters, it will vibrate or shake while rotating due to unbalance, causing reduced effectiveness of the pump, improper functioning of the pump or even preventing the pump from functioning entirely. A bent shaft can also damage bearings, seals and couplings in the pump assembly, and cause material fatigue and shaft misalignment.

Conventional methods for straightening the shaft of a rotating assembly in electric submersible pump applications, and other applications with stringent straightness requirements, have changed very little over the past century and make use of a dial indicator, measuring scale or ruler. A typical tooling apparatus for straightening a shaft is shown in FIG. 1. Shaft 100 is supported on work bench 110 by conventional pillars 120 and conventional bearings 130. Work bench 110 is of a known flatness. Conventional pillars 120 are attached to work bench 110 and act as intermittent support for shaft 100, such as every 2 ft. along the shaft. Conventional bearings 130 nest into conventional pillars 120, and shaft 100 is inserted into conventional bearings 130. A dial indicator 140 mounted on a base is positioned next to shaft 100. Dial indicator 140 is magnetically attached to work bench 110, such that a human operator can move dial indicator 140 along the length of shaft 100 (along conventional x-axis 160). Dial indicator 140 includes needle 150, which hangs below dial indicator 140 and touches shaft 100.

FIG. 2 describes the conventional straightening process using dial indicator 140. At step 200, shaft 100 is suspended above work bench 110 in conventional bearings 130. At step 210, dial indicator 140 is set up over the top center of shaft 100 at a known distance, as measured by a human operator, along conventional x-axis 160 of shaft 100 and locked into place. At step 220, dial indicator 140 is zeroed out to begin the evaluation process. Shaft 100 is then rotated about conventional x-axis 160 at step 230, while dial indicator 140 is monitored by a human operator for movement outside an allowable tolerance from zero, such as 0.002 inches. A human operator then determines whether there has been a deviation beyond the allowable tolerance at step 270. If during rotation dial indicator 140 does not deviate beyond the allowable tolerance as deemed by a human operator, shaft 100 is considered straight at the measured location on shaft 100 at step 240. In such instances, dial indicator 140 is then relocated an inch further down shaft 100 to the next position to be measured. If on the other hand, dial indicator 140 deviates beyond the allowable tolerance while shaft 100 is rotated (as indicated by movement of dial indicator 140), the surface of shaft 100 must be mechanically manipulated at the bent location at step 250 in order to straighten shaft 100. At step 260, dial indicator is, placed back into its previous position, re-zeroed and the previously manipulated location must be re-measured. This process is repeated as indicated at step 270 until the bent location is straight within the allowable tolerance, and also repeated along the entire length of shaft 100, as indicated at step 280, until the measurement is complete at step 290.

The conventional technique for straightening elements of rotating assemblies is exceedingly time consuming, tedious and subject to human error in positioning, zeroing and reading dial indicator 140. For example, straightening a 20 foot shaft using conventional methods may take as long as eight hours and still suffer in accuracy even after excessive man hours have been spent. In addition, wear and surface anomalies in the tooling surface, support pillars and bearings may cause further inaccuracies in the measurement and straightening process. Thus, currently available straightening techniques do not satisfactorily provide the speed or quality assurance desired in connection with the straightening of rotating assemblies, particularly those with little-to-no bend tolerance, such as those with acceptable deviations of less than about 0.005 inches and/or those with acceptable deviations of only about 0.002-0.003 inches, as are used in high speed multi-stage pumps. Therefore, there is a need for faster and more accurate ways of straightening elements of rotating assemblies, and a need for an apparatus, system and method for measuring straightness of components of rotating assemblies.

BRIEF SUMMARY OF THE INVENTION

One or more embodiments of the invention enable an apparatus, system and method for measuring straightness of components of rotating assemblies.

An apparatus, system and method for measuring straightness of components of rotating assemblies are described. A system of an illustrative embodiment for measuring a component of a rotating assembly includes a light emitting micrometer configured to map the surface of the component. In some embodiments, the light emitting micrometer traverses at least a portion of the length of the component during surface mapping. In some embodiments, the component is suspended proximate a work surface. In some embodiments, the system further includes a controller electronically coupled to the light emitting micrometer. In certain embodiments, the light emitting micrometer is a light emitting diode (LED) micrometer. In some embodiments, the light emitting micrometer is a laser micrometer. In some embodiments, the component is a shaft for an electric submersible pump.

A system of an illustrative embodiment may include a digital mapping system for measuring the straightness of a shaft of an electric submersible pump comprising a light emitting micrometer. In certain embodiments the system further comprises a range finder mechanically coupled to the light emitting micrometer. In some embodiments, the range finder is a vertical range finder for determining the distance above a work surface of a location on the shaft. In certain embodiments, the range finder is a horizontal range finder for determining the location of a measurement made by the light emitting micrometer along the length of the shaft. In certain embodiments, a computer is electronically coupled to the light emitting micrometer, wherein the computer calculates the vertical force needed to straighten a bend in the shaft. In certain embodiments, a computer is electronically coupled to the light emitting micrometer, wherein the computer calculates the heat needed to straighten a bend in the shaft. In some embodiments, the system further comprises a manipulation device electronically coupled to the computer, wherein the manipulation device autonomously straightens the bend in the shaft.

An apparatus for measuring a component of a rotating assembly comprises a light emitting micrometer arranged to travel along a work surface proximate at least a portion of the length of a component, wherein the micrometer is configured to map the surface of the component, and a range finder coupled to the micrometer for determining the location of the micrometer with respect to a known location.

A method for measuring the straightness of components of rotating assemblies includes providing a controller with acceptable deviation parameters for a component to be measured, surface mapping the component using a light emitting micrometer, electronically identifying bent locations on the component that exceed the acceptable deviation parameters, and measuring circumferentially at the bent locations with the light emitting micrometer to determine the magnitude of the bend.

A method for measuring the straightness of components of rotating assemblies comprises measuring the straightness of a component using a light emitting micrometer and electronically storing measurement data as it is obtained, wherein the measurement data comprises the location of a bend along the component and the magnitude of the bend.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The above and other aspects, features and advantages of illustrative embodiments will be more apparent from the following more particular description thereof, presented in conjunction with the following drawings wherein:

FIGS. 3A-3C illustrate perspective views of one embodiment of an exemplary system for measuring straightness of a components of a rotating assembly.

Figure 1:
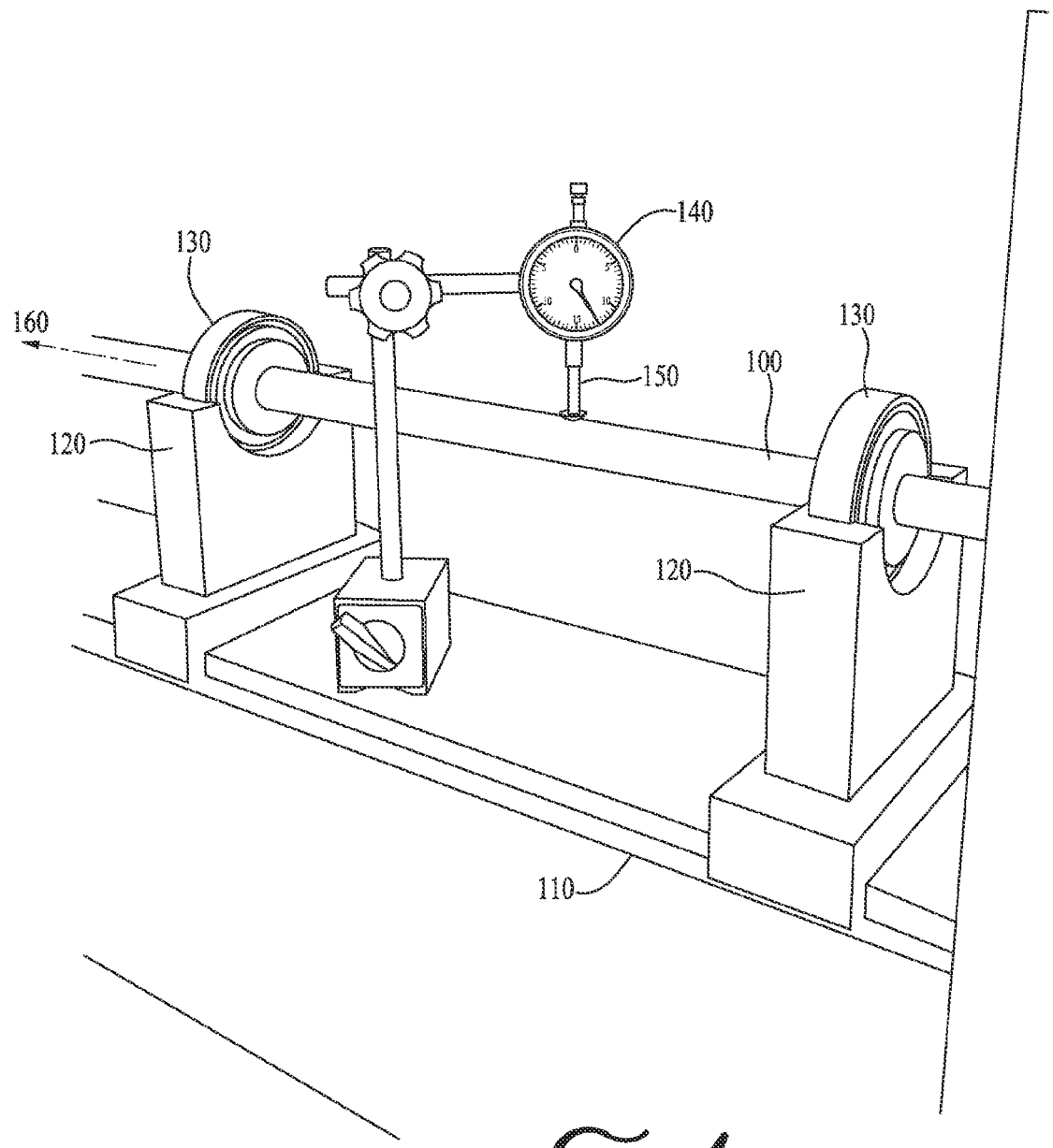
FIG. 1 illustrates a system for measuring the straightness of a component of a rotating assembly of the prior art.
Figure 2:
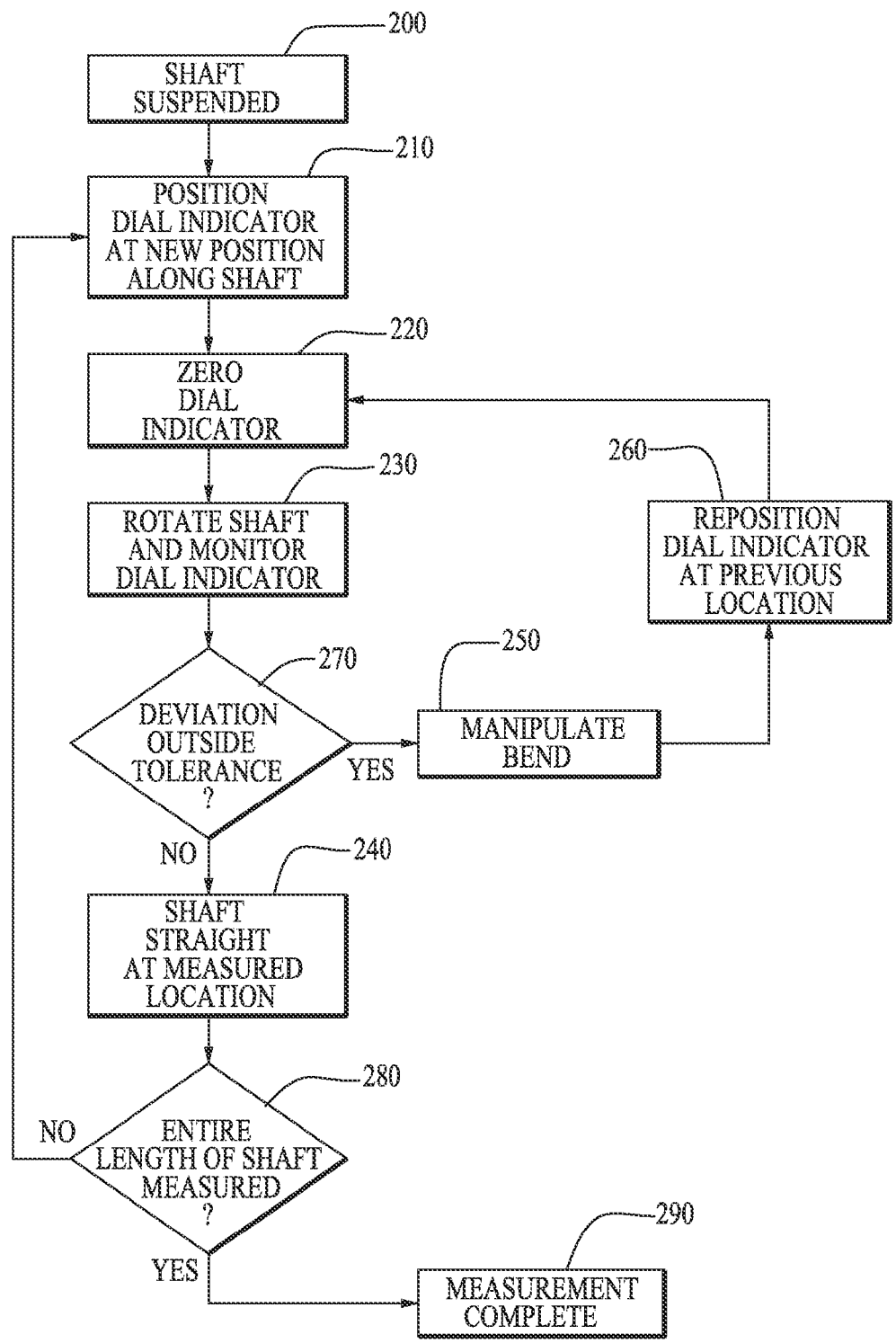
FIG. 2 is a flowchart illustrating a method of measuring the straightness of a component of a rotating assembly of the prior art.

While the invention is susceptible to various modifications and alternative forms, specific embodiments thereof are shown by way of example in the drawings and may herein be described in detail. The drawings may not be to scale. It should be understood, however, that the embodiments described herein and depicted in the drawings are not intended to limit the invention to the particular form disclosed, but on the contrary, the intention is to cover all modifications, equivalents and alternatives falling within the spirit and scope of the present invention as defined by the appended claims.

DETAILED DESCRIPTION

An apparatus, system and method for measuring straightness of components of rotating assemblies will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a support structure includes one or more support structures.

"Coupled" refers to either a direct connection or an indirect connection (e.g., at least one intervening connection) between one or more objects or components. The phrase "directly attached" means a direct connection between objects or components.

One or more embodiments of the invention provide an apparatus, system and method for measuring straightness of components of rotating assemblies. While for illustration purposes the invention is described in terms of measuring components of rotating assemblies for straightness, such as the shaft of an electric submersible pump, nothing herein is intended to limit the invention to that embodiment. The invention may be equally applicable to any item which must be straight, flat or free from wear within about a 0.001-0.005 inch deviation or less, for example work surfaces, bearings, supports or axles.

The invention disclosed herein includes an apparatus, system and method for measuring straightness of components of rotating assemblies. In some embodiments, the component to be measured for straightness may be suspended above or in front of a work surface of known flatness inside support elevated bearings. A light emitting micrometer, for example a laser or light emitting diode (LED) micrometer, may be electronically coupled to a controller. Acceptable deviation parameters for the component may be entered into the controller. The light emitting micrometer scans the component and maps the surface of the component. Locations on the component having deviations outside the acceptable parameters (bent locations) may be electronically recorded as the measurements are taken. In some embodiments, the light emitting micrometer is returned to a bent location and scans the component while the component is circumferentially rotated about its x-axis to identify the extent of deviations (i.e., highs and lows). In some embodiments, a computer or controller calculates the force or heat needed to straighten the bend. In certain embodiments, a range finder is employed to ascertain the distance of a bend from a known location and/or the height of a location on the component above a work surface.

Figure 3A:
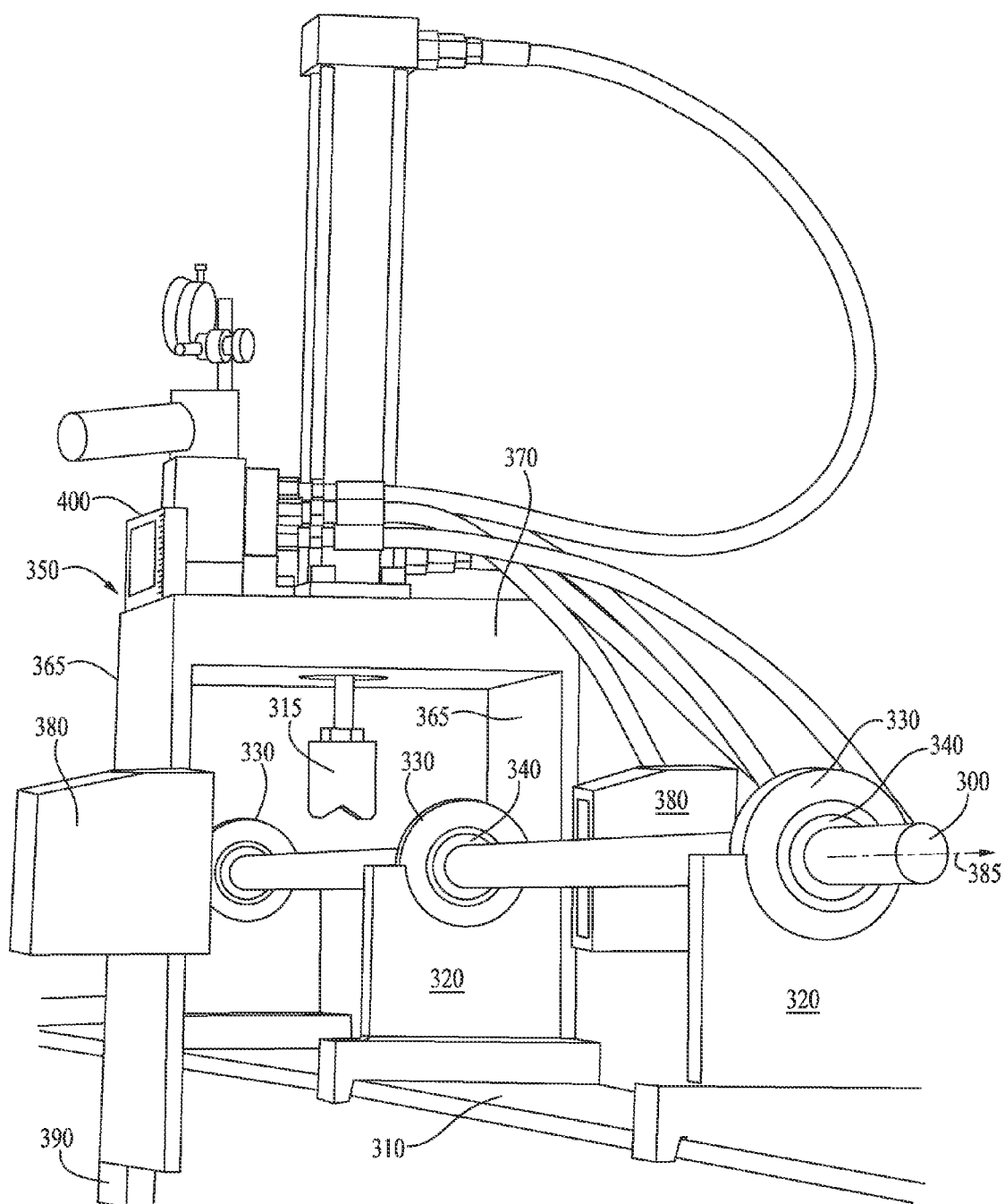
Figure 3C:
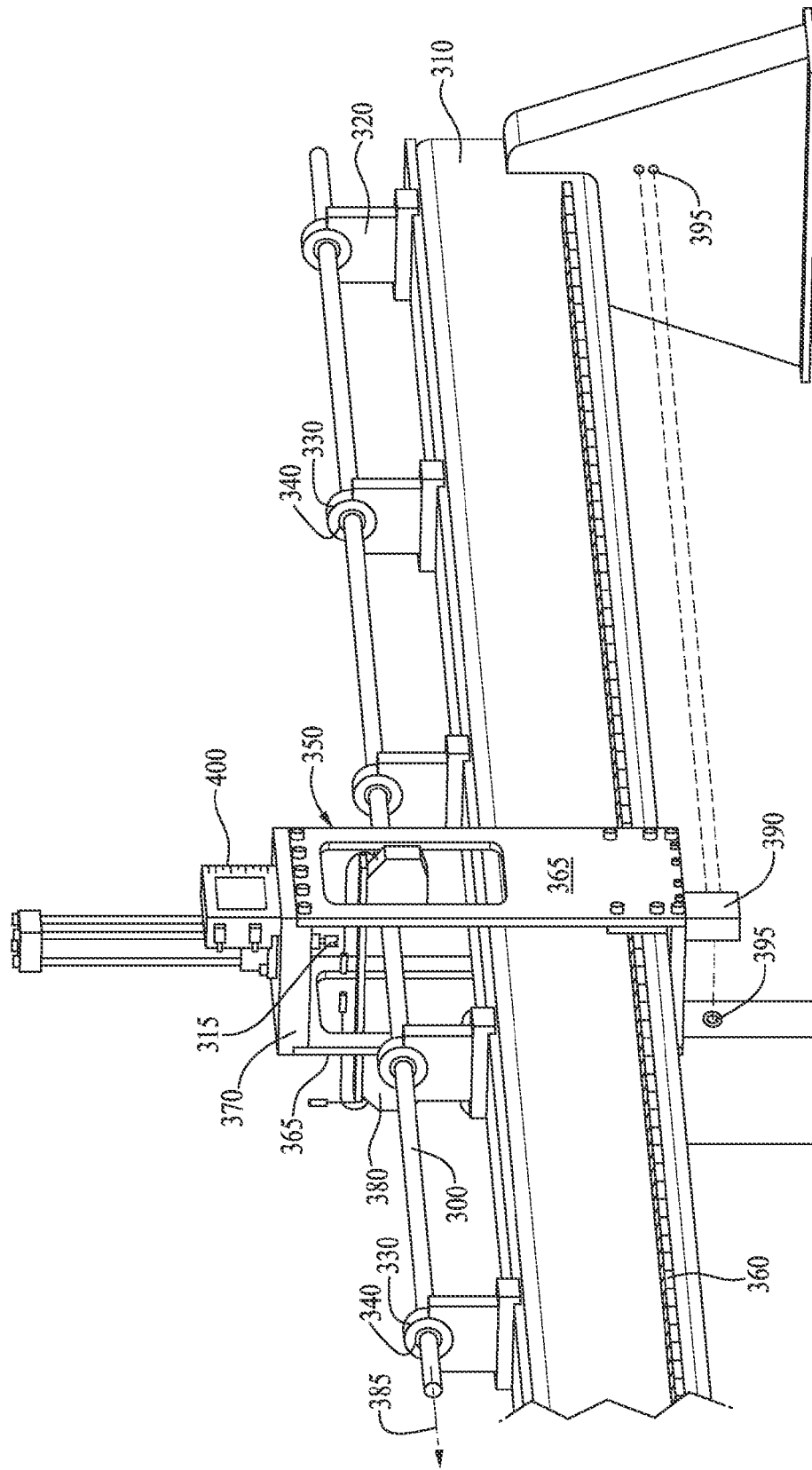

The invention includes an apparatus for measuring the straightness of components of rotating assemblies. FIGS. 3A-3C illustrate one embodiment of an exemplary measurement system. As shown in FIGS. 3A-3C, component 300 is arranged to be measured for straightness. Component 300 may be a shaft of a high-speed multi-stage pump, the shaft of an electric submersible pump, a drive shaft, an axle, tubing for a pump assembly, work surface 310, bearings 330 or any other component having stringent straightness, flatness or wear-free requirements, for example components which must be straight within about a 0.002-0.003 inch deviation or within a 0.005 inch deviation. In some embodiments, component 300 may be 20 feet long, 10 feet long or as little as two feet long. In certain embodiments, component 300 may be cylindrical, cubical, rectangular or planar in shape. Work surface 310 may be of a known flatness and may have previously been measured using the apparatus, systems and methods of the invention described herein.

Support structures 320 may support component 300 above or in front of work surface 310. In some embodiments, component 300 is suspended vertically from the ceiling and support structures 320 are not necessary. In certain embodiments, only a single support structure 320 may be needed. In some embodiments, multiple support structures 320 intermittently support component 300 above work surface 310. For example, support structures 320 may be placed every 2 feet, 4 feet or 6 feet along component 300. The spacing, type and arrangement of support structures 320 may depend on the length and shape of component 300 and/or the manner in which component 300 is suspended. For example, if component 300 is cylindrical in shape, support structures 320 may include bearings 330 and/or cylinder inserts 340 arranged at intervals along component 300. Cylinder inserts 340 may have an outer diameter that nests into bearings 330 and an internal diameter slightly larger than the outer diameter of component 300. Component 300 may rest inside bearings 330 and/or cylinder inserts 340. Support structure 320, bearings 330 and/or cylinder inserts 340 may have been previously measured for flatness or wear using the apparatus, systems and methods of the invention described herein.

In some embodiments, travel block 350 may be configured to slide along work surface 310 and the length (along x-axis 385), or any other dimension, of component 300. In some embodiments, travel block 350 may be moveably attached to railings 360 on work surface 310. In certain embodiments travel block 350 may include sides 365 and/or top 370 that may clear the width and/or top of component 300, without physically contacting component 300 as travel block 350 travels along the length or other dimension of component 300. In some embodiments, travel block 350 may not include all of top 370 or one or more sides 365. In certain embodiments, travel block 350 may be any means to carry light emitting micrometer 380 along component 300 and/or to allow light emitting micrometer 380 to scan the desired location(s) on component 300, such as a platform with wheels or a stationary platform with a pivot. In some embodiments, light emitting micrometer 380 may remain stationary while component 300 is scanned and/or component 300 may be moved as needed such that the desired section of component 300 may be scanned. In certain embodiments, there is no need for travel block 350 to slide or travel or travel block 350 is not necessary. Movement of travel block 350 and/or component 300 during scanning may be automated or human operated. In some embodiments, movement of travel block 350 may be controlled by controller 400 and/or computer 430 (shown in FIG. 4).

In certain embodiments light emitting micrometer 380 may be attached to travel block 350, such that light emitting micrometer 380 may scan component 300. Light emitting micrometer 380 may be a laser micrometer, LED micrometer, or any other electromagnetic or acoustic non-contact measurement device suitable for measuring within small deviation parameters, such as deviations less than about 0.005 inches. In certain embodiments, light emitting micrometer 380 may measure straightness deviations of about 0.001 inches, about 0.002 inches, about 0.003 inches and/or about 0.005 inches. In some embodiments, light emitting micrometer 380 may measure deviations less than about 0.001 inches.

In some embodiments, range finder 390 may be fixedly or moveably attached to travel block 350 and/or light emitting micrometer 380 to assist in surface mapping component 300. Range finder 390 may be a laser, LED or acoustic measuring device capable of measuring the distance of travel block 350 and/or light emitting micrometer 380 along component 300 and/or along x-axis 385 of component 300, for example by measuring the distance of travel block 350 from known fixed point 395. Range finder 390 may also measure the height of component 300 above work surface 310 at any particular location along the length of component 300, such as to ensure the flatness of work surface 310 or to ensure that component 300 is supported horizontally or vertically above or in front of work surface 310 within the allowable tolerance. In some embodiments, range finder 390 may be light emitting micrometer 380. In some embodiments, ranch finder 390 is integral with light emitting micrometer 380. In certain embodiments, range finder 390 is distinct from light emitting micrometer 380. In further embodiments, range finder 390 may be configured to measure larger dimensions than light emitting micrometer 380. In some embodiments, range finder 390 may be equipped with a long range sensor to measure greater distances, such as distances greater than 12 feet, 15 feet or 20 feet.

Travel block 350 may also include manipulation device 315. Manipulation device 315 may apply force and/or heat to component 300 in bent locations to correct deviations outside the acceptable parameters (tolerance). In some embodiments manipulation device 315 is a hydraulically actuated cylinder. In certain embodiments, manipulation device 315 is a pneumatically actuated cylinder. In certain embodiment, manipulation device 315 is a thermal heater.

Figure 4:
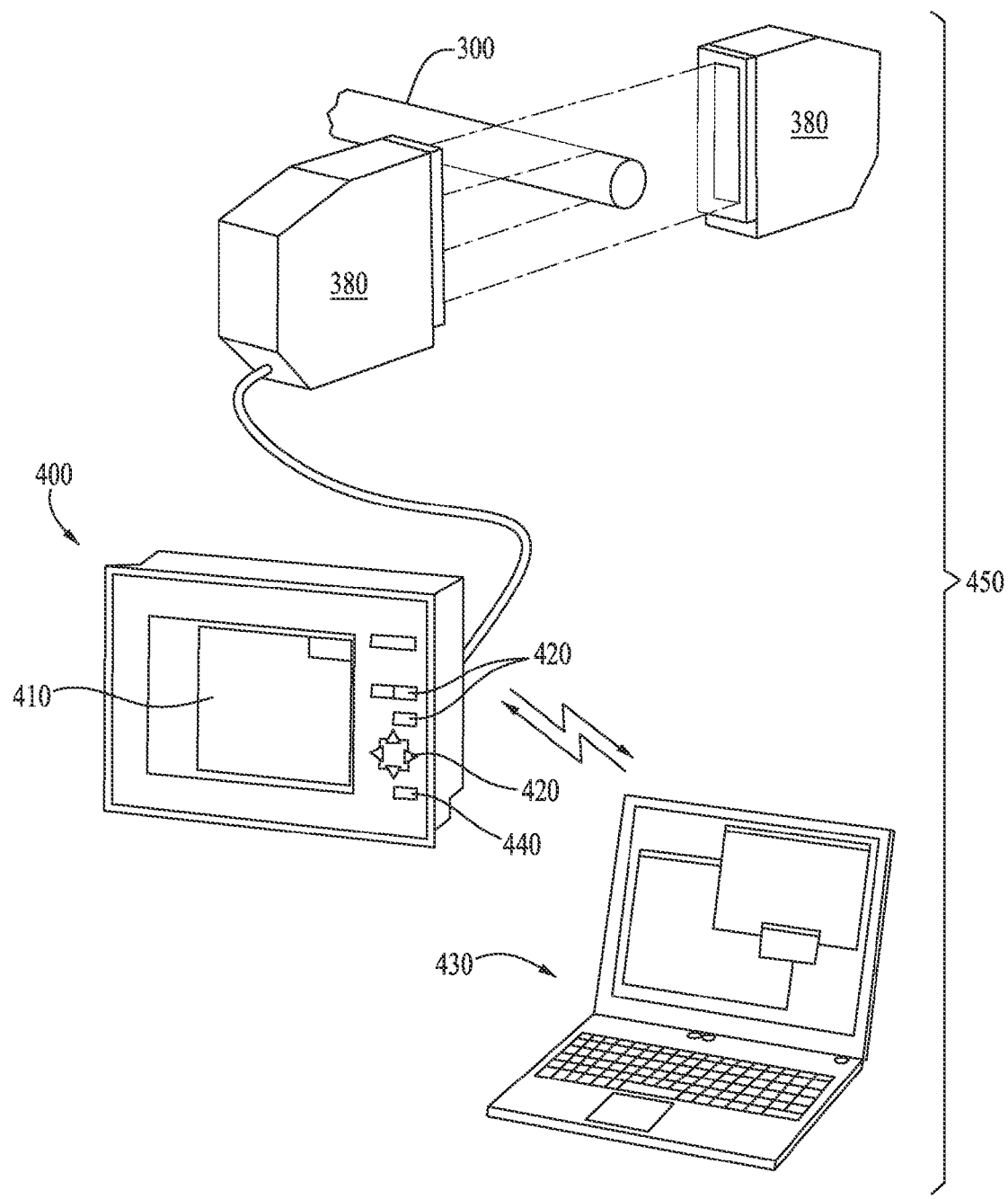
FIG. 4 illustrates a perspective view of one embodiment of a digital mapping system.

Light emitting micrometer 380 and/or range finder 390 may be electronically coupled to controller 400 (shown in FIG. 4). FIG. 4 illustrates a perspective view of an exemplary embodiment of digital mapping system 450. Controller 400 may include digital display 410 and inputs 420 for entering acceptable deviation parameters and/or the characteristics of component 300, such as the size or material composition of component 300. As shown in FIGS. 3A-3C, controller 400 may be located on travel block 350. In some embodiments, controller 400 may include an auto-zero function for zeroing light emitting micrometer 380. In certain embodiments, controller 400 may provide an auditory signal, such as "beep", when a measurement falls outside the acceptable deviation parameters. In some embodiments, controller 400 may include digital memory for storing setting data and measured values. In certain embodiments, computer 430 coupled to light emitting micrometer 380, range finder 390 and/or controller 400, may store setting data, measured values and/or control light emitting micrometer 380 and/or range finder 390. In some embodiments computer 430 may receive and store data indicating the location(s) along shaft 300 that are bent (deviate outside the allowable tolerance), for example the distance of each bent location from the end of shaft 300, and/or the magnitude of the deviation at each bent location. In certain embodiments, data is stored electronically in real time as it is ascertained.

In some embodiments, computer 430 may be wired to controller 400 at port 440 or, as shown in FIG. 4, may be wirelessly coupled to controller 400. In further embodiments, computer 430 may not be coupled to any of controller 400, light emitting micrometer 380 or range finder 390 at the time that measurements are taken, but data may subsequently be transferred to a computer and backed-up, managed and/or analyzed. In certain embodiments, controller 400 is computer 430. In some embodiments, controller 400 is integral with light emitting micrometer 380. In certain embodiments, controller 400 is a control panel on light emitting micrometer 380 or travel block 350. Computer 430 may be in wired or wireless communication with light emitting micrometer 380 and/or controller 400.

Figure 5:
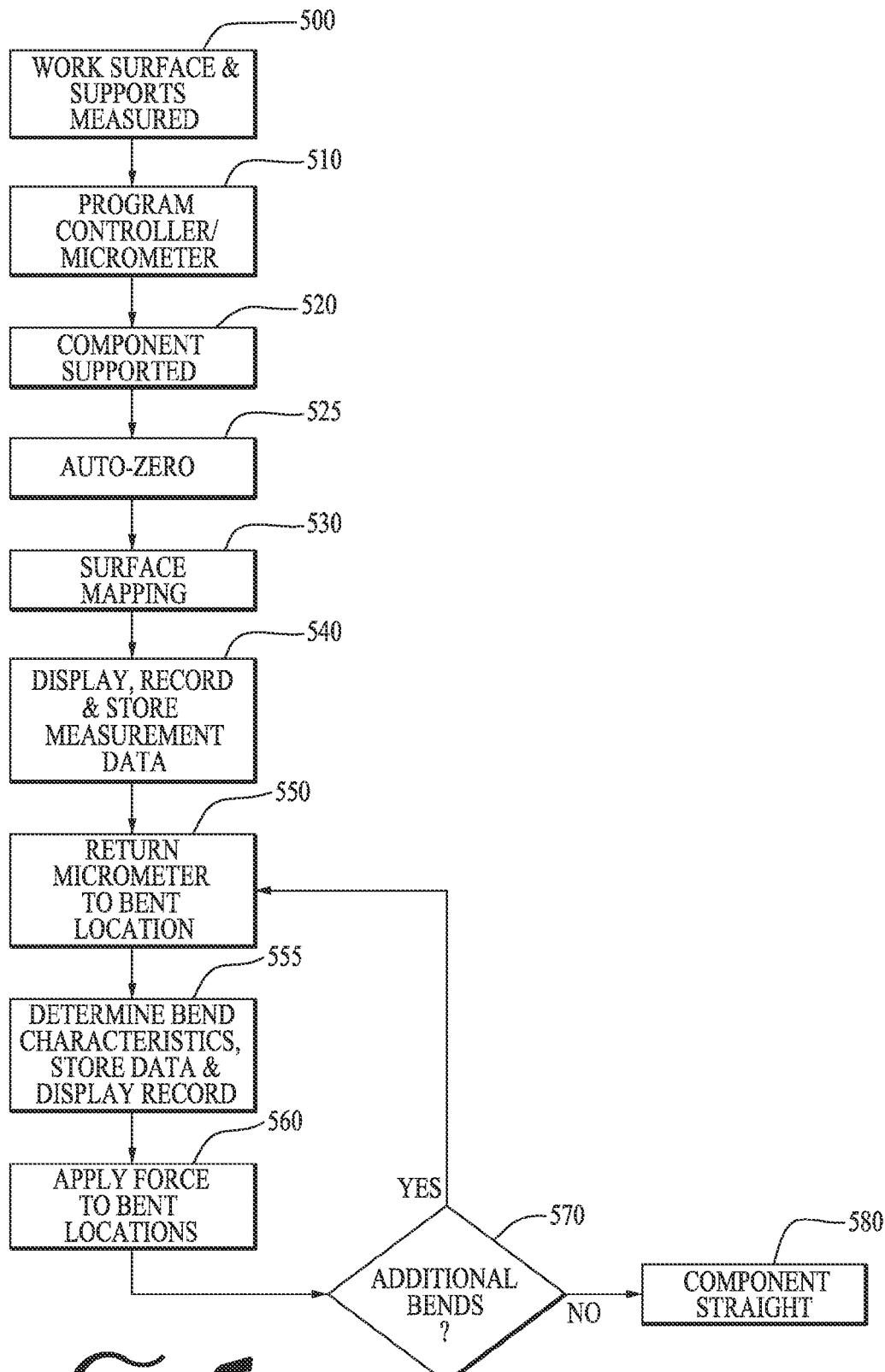
FIG. 5 is a flowchart illustrating an exemplary method of measuring the straightness of a component of a rotating assembly.

FIG. 5 is a flow chart illustrating an exemplary method of measuring the straightness of a component of rotating assemblies. At step 500, work surface 310, bearings 330, cylinder inserts 340 and/or support structure 320 may be measured for flatness and/or wear using the apparatus, systems and methods of the invention. In some embodiments, work surface 310, bearings 330 and cylinder inserts 340 are of a known flatness and step 500 is not required. Light emitting micrometer 380, controller 400 and/or computer 430 may be programmed with acceptable deviation parameters designating the extent to which the straightness of component 300 may vary, and/or other information regarding component 300, at step 510. In certain embodiments, acceptable deviation parameters and information regarding component 300 may have been previously stored in controller 400 and/or computer 430 and step 510 may not be necessary. At step 520 component 300 may be suspended above (if work surface 310 is horizontal) or in front of (if work surface 310 is vertical) work surface 310 using support structure 320, bearings 330 and/or cylinder inserts 340. In some embodiments, component 300 may be vertically supported from above, such as hung from the rafters of the ceiling and/or work surface 310 is not necessary. At step 525 light emitting micrometer 380 may be zeroed at the top center of component 300 using the zero function on controller 400, light emitting micrometer 380 and/or computer 430 at a known location along the length of component 300, which location may be verified or ascertained by range finder 390.

Figure 6A:
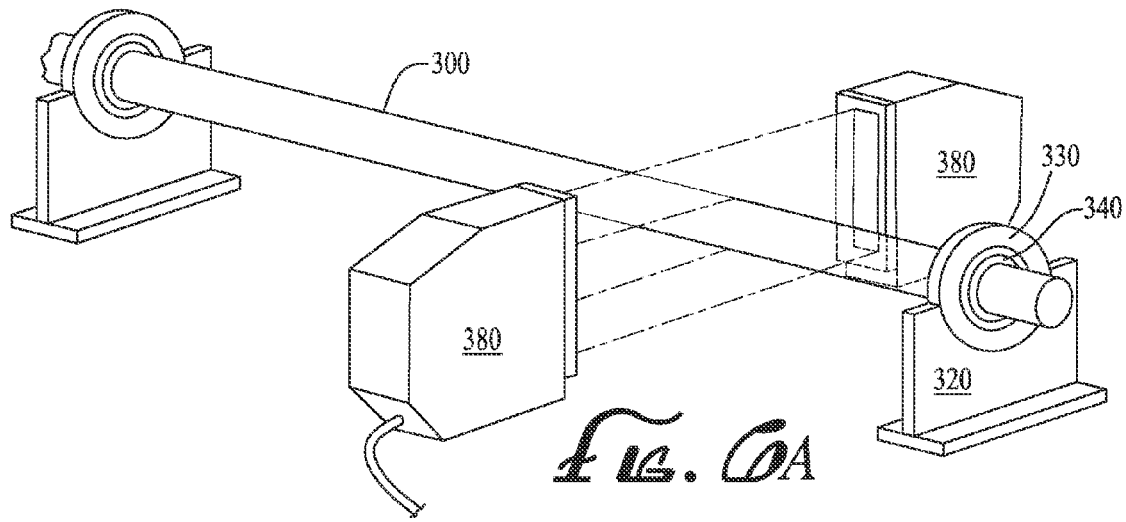
FIGS. 6A-6C illustrate a perspective view of an exemplary light emitting micrometer while scanning a component.
Figure 6B:
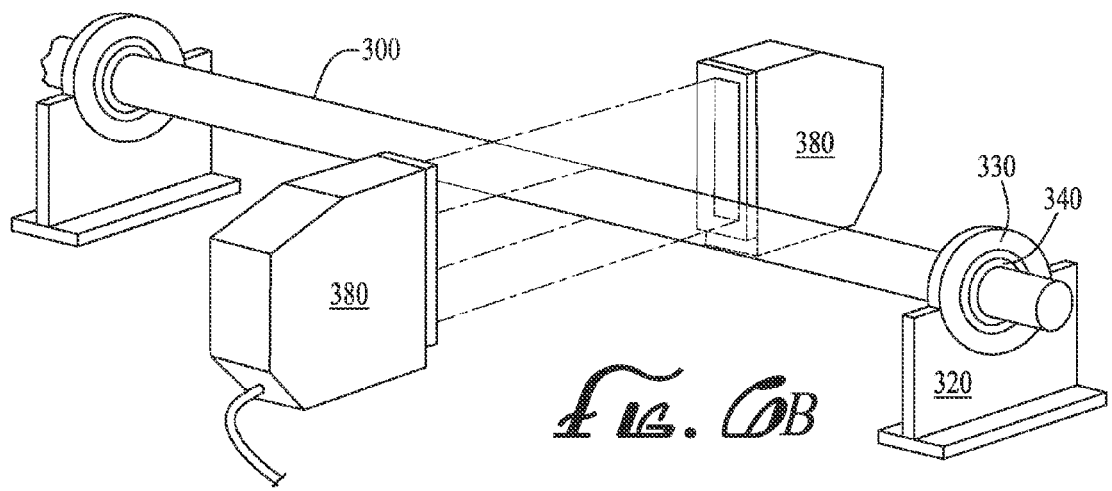
Figure 6C:
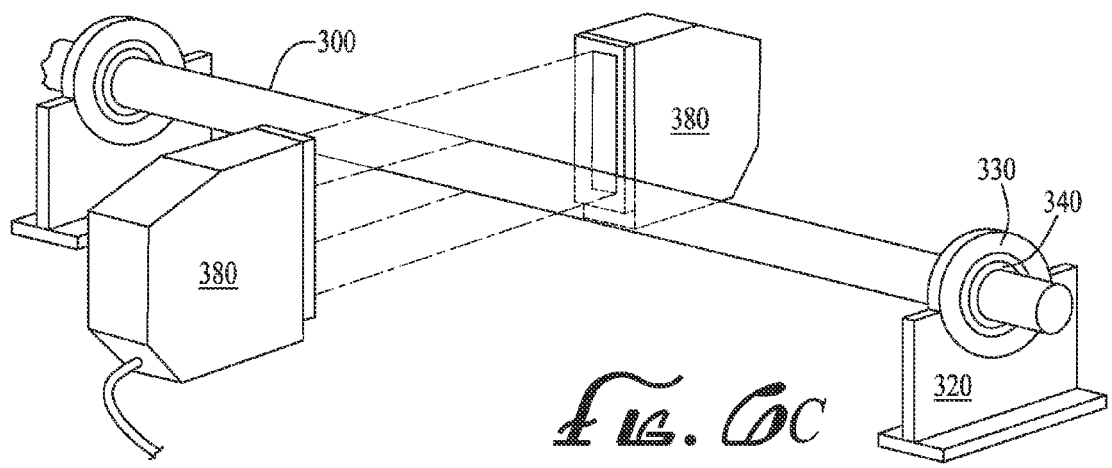

Surface mapping of component 300 may occur at step 530. Step 530 may include moving travel block 350, light emitting micrometer 380 and/or range finder 390 along the length (x-axis) or other dimension of component 300. In some embodiments, light emitting micrometer 380 may remain stationary and component 300 may pass proximate and/or in front of light emitting micrometer 380 during step 530. Light emitting micrometer 380 may scan component 300 as it moves along or is directed towards the length or other desired dimension or location(s) of component 300 and measures deviations from zero. In certain embodiments, travel block 350, light emitting micrometer 380 and/or range finder 390 may not be required to move in order scan the desired locations along component 300. In some embodiments component 300 may remain stationary during measurement. In other embodiments, component 300 may be moved or rotated during measurement, such as rotated about x-axis 385 and/or pulled or pushed along x-axis 385. FIGS. 6A-6C illustrate one exemplary embodiment of light emitting micrometer 380 surface mapping component 300 and demonstrate light emitting micrometer 380 at different locations along component 300.

Returning to FIG. 5, measurement data may be displayed, recorded and/or stored on controller 400 and/or computer 430 at step 540. In some embodiments, at step 540, measurements that deviate beyond the acceptable deviation parameters, and the locations along the length of component 300 that such deviate measurement occurred (e.g., as ascertained by range finder 390) may be displayed, stored, analyzed and/or recorded on controller 400 and/or computer 430. In some embodiments, a user may be auditorily or visually notified when a bent location is identified, for example with a beep or a light turning on or flashing on controller 400 and/or computer 430. At step 550, travel block 350 and/or light emitting micrometer 380 may be returned to previously identified bent locations, at which point additional dimensions of component 300 may be surface mapped at bent location(s) to identify specific characteristics of a bend at step 555, for example the highs and lows of a bend. In certain embodiments, this additional data may also be stored on controller 400 and/or computer 430. In some embodiments, component 300 may be rotated about x-axis 385 within bearings 330 and/or cylinder inserts 340 and measured circumferentially at the bent locations, and the additional data may be displayed, stored and/or recorded with controller 400 and/or computer 430. Rotation and/or movement of component 300 and/or light emitting micrometer 380 at step 555 may vary depending on the shape of component 300, the configuration of travel block 350 and the nature of the information desired. In some embodiments, rotation and/or movement of component 300 and/or light emitting micrometer 380 is automated. In some embodiments, rotation and/or movement of component 300 and/or light emitting micrometer 380 is not necessary to identify bend characteristics. In some embodiments, steps 550, 555 are not necessary.

Force and/or heat may be applied to bent locations as needed using manipulation device 315 to straighten bent locations at step 560. Computer 430 and/or controller 400 may automatically calculate the force and/or heat needed to straighten bent locations. In some embodiments, the force and/or heat may be calculated using a component-specific elastic-plastic model in conjunction with information regarding the location and magnitude of a particular bend. In certain embodiments, the force may be calculated using information regarding the material composition of the component, the diameter or thickness of the component and the location and magnitude of the bend(s). In some embodiments, the force calculation depends on the composition of the component, the shape and size of the component and/or the location and size of the bend. In some embodiments, manipulation device 315 may operate autonomously to straighten bends.

As indicated at step 570, steps 550-560 may be repeated as necessary to ensure component 300 is straight throughout its length within the acceptable deviation parameters. If light emitting micrometer 380 is already at a bent location, repetition of step 550 may not be necessary. Component 300 may be deemed straight within the acceptable deviation parameters at step 580.

The inventions described herein may be suitable for a variety of types of components requiring straightness within minute parameters. For ease of description, the embodiments described herein are in terms of straightness along the length of a component, but those of skill in the art will recognize that the apparatus, system and method of the invention may be used to straighten or flatten components in any direction. The apparatus, systems and methods of the invention allow a 20 foot long component to be measured and straightened within about a 0.001-0.005 inch deviation in about half the time and with a greater degree of accuracy than was possible with the decades old conventional technology. In some embodiments, a 20 foot long component may be measured and straightened in as little as 3 hours and within about a 95% degree of accuracy.

While the invention herein disclosed has been described by means of specific embodiments and applications thereof, numerous modifications and variations could be made thereto by those skilled in the art without departing from the scope of the invention set forth in the claims. The embodiments described in the foregoing description are therefore considered in all respects to be illustrative and not restrictive. The scope of the invention is indicated by the appended claims, and all changes that come within the meaning and range of equivalents thereof are intended to be embraced therein.

What is claimed is:

1. A system for measuring the straightness of an electric submersible pump (ESP) shaft, the system comprising:
    a work surface of known flatness;
    a pair of bearings elevated above the work surface;
    an ESP shaft to be measured, suspended inside the elevated bearings and rotatable within the elevated bearings;
    a light emitting micrometer moveably attached to the work surface, the light emitting micrometer comprising:
        a light emitter on a first side of the ESP shaft that when activated emits a sheet of light;
        a light receiver on a second side of the ESP shaft opposite the light emitter such that the ESP shaft comes between the light emitter and the light receiver and produces a shadow when the light emitter is activated; and
    wherein the light receiver detects the shadow;
    a computer electronically coupled to the light emitting micrometer such that data flows between the light emitting micrometer and the computer, and the computer has an elastic plastic model for a material composition of the ESP shaft stored thereon;
    a hydraulic cylinder electronically coupled to the computer and mechanically coupled to the light emitting micrometer; and
    a digital display electronically coupled to the computer;
    wherein the computer calculates one of a heat, a force or a combination thereof needed to straighten a bend in the ESP shaft using the elastic plastic model, and wherein the hydraulic cylinder straightens the bend in the ESP shaft by applying the one of the heat, the force or the combination thereof so calculated.

2. The system of claim 1, wherein the bend comprises a deviation outside allowable deviation parameters for a straightness of the ESP shaft, and the allowable deviation parameters are input into the computer.

3. The system of claim 2, wherein the digital display shows where measurement data of the ESP shaft deviates outside the allowable deviation parameters.

4. The system of claim 1 wherein the digital display shows measurement data of a straightness of the ESP shaft.

5. The system of claim 1, wherein the computer has an auto-zero function.

6. The system of claim 3, wherein the computer stores the measurement data.

7. The system of claim 1, wherein the light emitting micrometer and the hydraulic cylinder are each fixedly coupled to a travelling block.

8. The system of claim 1, wherein the light emitting micrometer is a light emitting diode (LED) micrometer.

9. The system of claim 1, wherein the light emitting micrometer is a laser micrometer.

10. The system of claim 1, further comprising an electronic data-storage device electronically coupled to the light emitting micrometer.

11. The system of claim 1, wherein the ESP shaft is horizontally suspended relative to the light emitting micrometer.

12. The system of claim 11, wherein the elevated bearings allow the ESP shaft to circumferentially rotate within the bearings.

13. The system of claim 1, wherein the ESP shaft is vertically suspended relative to the light emitting micrometer.

14. The system of claim 1, wherein a surface map of the ESP shaft is created by the system.

15. The system of claim 14, wherein the ESP shaft passes proximate to the light emitting micrometer during surface mapping of the rotating assembly component while the light emitting micrometer remains stationary during surface mapping.

16. The system of claim 14, wherein the light emitting micrometer traverses the length of at least a portion of the ESP shaft during surface mapping.

17. An apparatus for measuring the straightness of a shaft of an electric submersible pump (ESP) assembly:
    a traveling block slideably coupled to a work surface;
    a shaft of an ESP assembly elevated above the work surface and oriented such that the traveling block slides parallel to the x-axis of the shaft of the ESP assembly and passes along at least a portion of the shaft of the ESP assembly;
    a light emitting micrometer situated about two opposing sides of the shaft of the ESP assembly and fixedly coupled to the traveling block such that the shaft of the ESP assembly passes between elements of the light emitting micrometer and produces a shadow in a sheet of light emitted by the light emitting micrometer when the traveling block slides along the work surface;
    a range finder fixedly coupled to the traveling block, and further electronically coupled to the light emitting micrometer such that the range finder can determine the location of the micrometer with respect to a known location relative to the work surface;
    a controller electronically coupled to the light emitting micrometer, wherein the controller identifies a bend on the ESP shaft and has an elastic plastic model of the ESP shaft stored thereon, and wherein the controller calculates a force needed to straighten the bend in the ESP shaft using the elastic plastic model; and
    a cylindrical manipulation device mechanically coupled to the travelling block, wherein the cylindrical manipulation device applies force to the bend as calculated by the controller.

18. A method for identifying straightness deviations outside acceptable deviation parameters of an electric submersible pump (ESP) shaft, the method comprising:
    placing an ESP shaft in a path of a sheet of light emitted by a light emitting micrometer;
    detecting a shadow created by the ESP shaft in the sheet of light using the light emitting micrometer;
    surface mapping the ESP shaft using the light emitting micrometer by sliding the light emitting micrometer along the x-axis of the ESP shaft;
    comparing the surface map to acceptable deviation parameters to determine a deviation from straightness;
    returning the light emitting micrometer to a location on the ESP shaft having the deviation from straightness;

identifying a magnitude of the deviation from straightness by rotating the ESP shaft circumferentially about its x-axis and scanning the location after the light emitting micrometer has been returned thereto;

calculating an amount of force and heat needed to straighten the deviation from straightness, the calculation comprising use of an elastic-plastic model specific to a material of the ESP shaft; and straightening the deviation from straightness by applying the amount of force and heat so calculated using a cylindrical manipulation device mechanically coupled to the light emitting micrometer.

19. The method of claim 18, wherein the acceptable deviation parameters are less than 0.005 inches.

20. The method of claim 18, wherein the acceptable deviation parameters are 0.002 inches.

21. The method of claim 18, the method further comprising displaying the surface map information on a digital display.

22. The method of claim 21, wherein the indication of straightness deviation is displayed on the digital display.

* * * * *